May 21, 1963     R. M. SHAVER ETAL     3,090,160

RAILWAY CAR ROOF HATCH

Filed Feb. 20, 1956

INVENTORS
RAYMOND M. SHAVER AND
ARTHUR H. HARTWIG
BY Wayne Morris Russell
ATTY.

United States Patent Office 3,090,160
Patented May 21, 1963

3,090,160
RAILWAY CAR ROOF HATCH
Raymond M. Shaver and Arthur H. Hartwig, Michigan City, Ind., assignors to Pullman-Standard Car Manufacturing Company, Chicago, Ill., a corporation of Delaware
Filed Feb. 20, 1956, Ser. No. 566,405
2 Claims. (Cl. 50—14)

The invention relates primarily to an arrangement of joining a hatch frame to the roof sheet of a vehicle roof.

The principal object of the invention is to produce a strong joint between the hatch and the roof sheet which is completely weatherproof. This latter feature is of the greatest importance in a vehicle in view of the types of material such as powdered or granular materials in bulk carried in certain types of vehicles having roof hatches.

The invention relates to the hatch and roof juncture and the combination and arrangement of parts hereinafter described and claimed.

Figure 1:
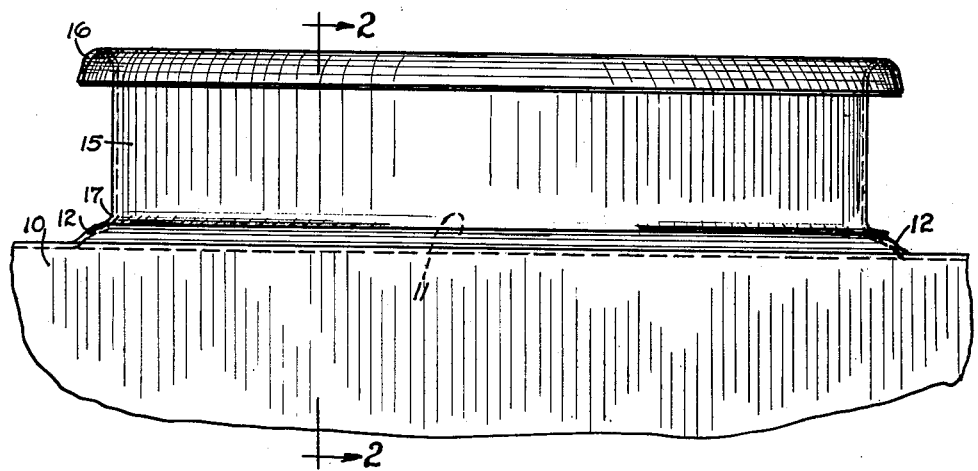
Figure 2:
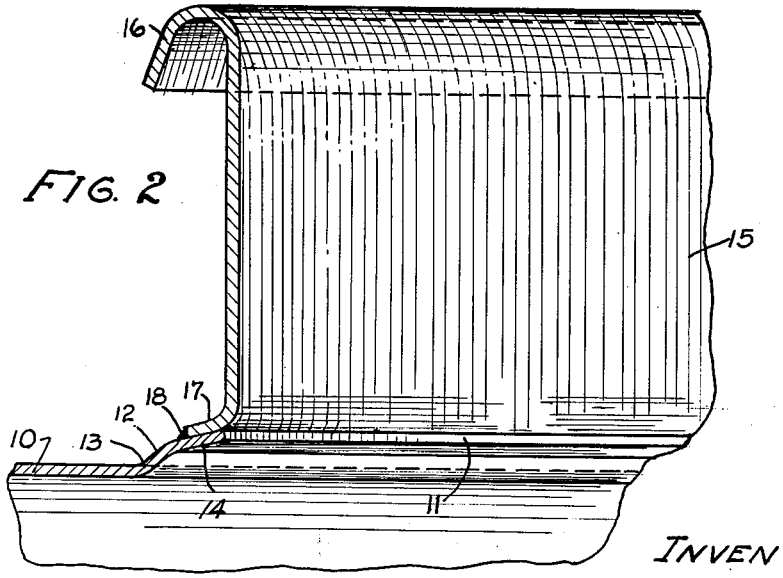

In the drawings FIG. 1 is a fragmentary view of the roof of a railway car showing a hatch frame secured to the roof of a hatch opening; and FIG. 2 is an enlarged fragmentary vertical sectional view taken of the line 2—2 of FIG. 1 showing the juncture of the hatch frame and roof sheet in detail.

The invention as shown in the drawings is disclosed as applied to a railway covered hopper car which has a roof sheet 10 wherein an opening 11 has been made through which the lading may be loaded. For the purpose of strengthening and stiffening the roof sheet 10 around the hatch opening and to provide a stronger and better fitting seat for a hatch frame an embossment 12 is formed at the edge of the sheet around the opening 11. The embossment comprises an upstanding angular portion 13 and an inwardly sloping seat portion 14 integral with the upstanding portion. The degree of angularity from the horizontal of the seat portion 14 is less than that of the upstanding portion 13. The inwardly sloping portion 14 is in the nature of an offset flange about the hatch opening 11 and upon which a hatch frame is adapted to be fitted and secured by welding to provide a tight leakproof juncture between the frame and car roof.

A hatch frame 15 having a rebent upper flange 16 extending outwardly and downwardly about the top of the hatch is secured by welding 18 to the offset seat 14 of the roof sheet 10 for the purpose of providing a sturdy roof hatch through which the lading may be loaded and adapted to support a hinged cover for sealing the opening.

The invention has been shown as applied to a railway covered hopper car but is applicable as well to refrigerator cars. As used in covered hopper cars, the top of the hatch frame 15 is covered by a direct fitting metal cover (not shown). The bottom edge of the frame 15 is flanged outwardly as at 17 in complementary relation to the embossed seat 14 on the roof sheet 10 so that the frame may be seated and secured in tight fitting relation on the top surface of the embossment and thereby obtain a completely weatherproof connection as the weld 18 is completed continuously about the joint formed by the flange 17 and the top surface of the portion 14. The juncture between the upstanding angular portion 13 and the inwardly sloping seat portion 14 of the embossment 12 provides a line of reference around the hatch opening which may be used as an aid in fitting or centering the hatch frame bottom flange 17 to the embossment. Correct centering of the frame can be easily checked by visual inspection of only a portion of the line of reference in relation to a portion of the outer edge 18 of the hatch frame bottom flange.

The advantages afforded by the present structure provide a strong and durable hatch frame supported on an embossment which stiffens the roof sheet at the hatch opening and provides a tight fitting joint between the hatch frame and roof sheet which is weather-tight and provides a seat for locating the hatch frame and gives better welding conditions and which is sloped for the purpose of drainage away from the hatch.

What is claimed is:

1. A roof hatch construction for a vehicle including a roof sheet having a hatch opening, an embossment formed in the margin of the roof sheet surrounding the opening comprising an upwardly directed outer portion inwardly sloping at an obtuse angle to the body of the sheet and an upwardly directed inner portion inwardly sloping at an obtuse angle to the outer portion, and a hatch frame having a vertical side wall terminating at its bottom in a marginal flange extending from said side wall at an angle substantially corresponding to the angle made by the inner portion of the embossment with the body of the sheet, said marginal flange being seated on the upper surface of said inner portion of the embossment and being welded thereto.

2. A roof hatch construction for a vehicle including a roof sheet having a hatch opening, an embossment formed in the margin of the roof sheet surrounding the opening comprising an upwardly directed outer portion inwardly sloping at an obtuse angle to the body of the sheet and an upwardly directed inner portion inwardly sloping at an obtuse angle to the outer portion and integrally connected thereto along a line marking the juncture of the two portions, and a hatch frame having a vertical side wall terminating at its bottom in a marginal flange extending from said side wall at an angle substantially corresponding to the angle made by the inner portion of the embossment with the body of the sheet, said marginal flange being seated on the upper surface of said inner portion of the embossment and having its outer edge welded thereto adjacent said line of juncture.

References Cited in the file of this patent
UNITED STATES PATENTS

| | | |
|---|---|---|
| 2,100,122 | Finger | Nov. 23, 1937 |
| 2,100,127 | Bonsall | Nov. 23, 1937 |
| 2,100,129 | Wilkoff | Nov. 23, 1937 |